US008573708B1

(12) United States Patent
Goodzey et al.

(10) Patent No.: US 8,573,708 B1
(45) Date of Patent: Nov. 5, 2013

(54) HYDRAULIC BRAKE BOOSTER WITH VARIABLE CONTROL VALVE FOR REGENERATIVE BRAKING

(75) Inventors: Gregory P Goodzey, South Bend, IN (US); Roger W Miller, Edwardsburg, MI (US)

(73) Assignee: Robert Bosch GmbH, Stuttgart (DE)

( * ) Notice: Subject to any disclaimer, the term of this patent is extended or adjusted under 35 U.S.C. 154(b) by 1138 days.

(21) Appl. No.: 12/143,874

(22) Filed: Jun. 23, 2008

(51) Int. Cl.
*B60T 13/74* (2006.01)
(52) U.S. Cl.
USPC .............................. 303/3; 303/151; 303/152
(58) Field of Classification Search
USPC .............. 303/3, 15, 152, 114.1, 151; 188/156
See application file for complete search history.

(56) References Cited

U.S. PATENT DOCUMENTS

| 4,425,005 | A | 1/1984 | Harwick | |
|---|---|---|---|---|
| 6,176,556 | B1 | 1/2001 | Kizer | |
| 7,146,812 | B2 * | 12/2006 | Nakashima et al. | 60/562 |
| 2008/0284242 | A1 * | 11/2008 | Ganzel | 303/114.1 |

FOREIGN PATENT DOCUMENTS

DE 4239386 5/1994

OTHER PUBLICATIONS

International Search Report in corresponding PCT application (i.e., PCT/US2009/047309) mailed Oct. 21, 2009 (3 pages).

* cited by examiner

*Primary Examiner* — Bradley King
*Assistant Examiner* — Vu Q Nguyen
(74) *Attorney, Agent, or Firm* — Maginot, Moore & Beck

(57) ABSTRACT

A hydraulic braking system for use in a vehicle employing both hydraulic and regenerative braking including a master cylinder with a reservoir inlet port and an outlet port. The outlet port is responsive to vehicle operator applied brake pedal pressure to close the inlet port and provide pilot pressure at the outlet port which is selectively coupled by a valve (57) to a hydraulic pedal simulator and to a control valve. The control valve provides boost hydraulic pressure from a pressure source to a vehicle wheel brake actuator in proportion to the pressure differential between the pilot pressure and a hydraulic pressure which is proportional to regenerative braking torque. This allows the power train controller to independently request different levels of regeneration on the two axles.

12 Claims, 2 Drawing Sheets

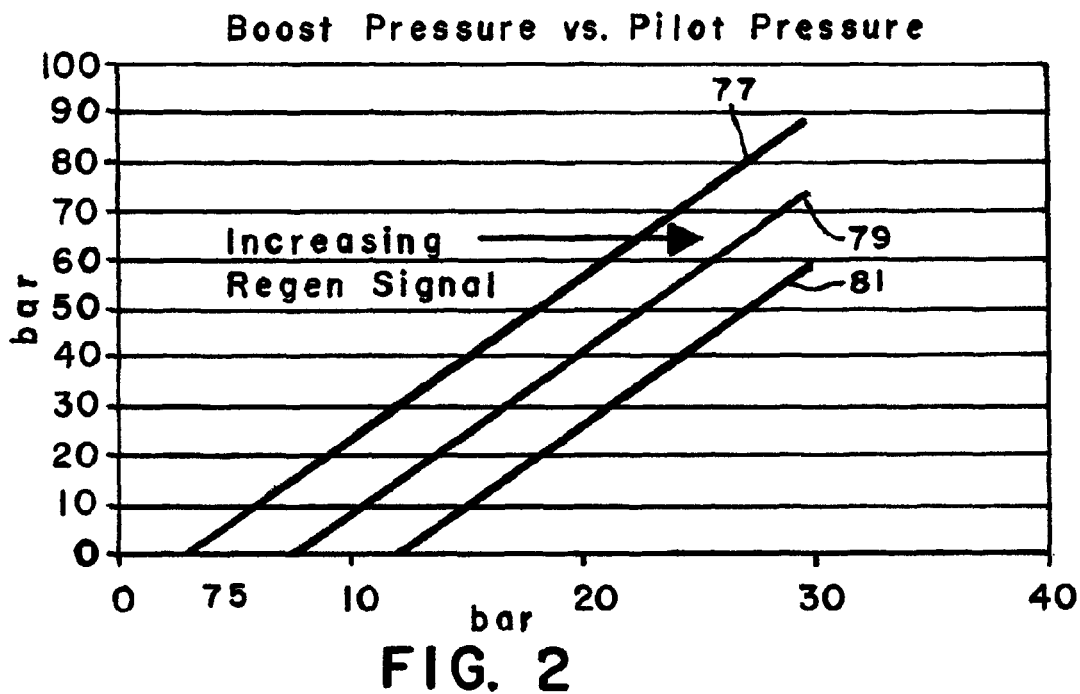
FIG. 2
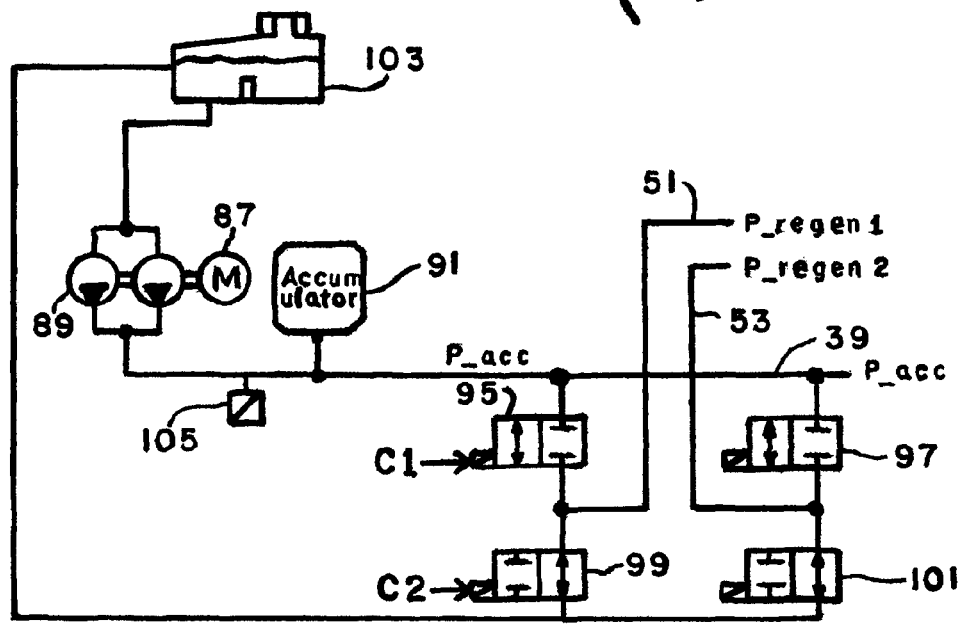
FIG. 3a
FIG. 3

HYDRAULIC BRAKE BOOSTER WITH VARIABLE CONTROL VALVE FOR REGENERATIVE BRAKING

BACKGROUND OF THE INVENTION

1. Field of the Invention

The present invention relates to hydraulic braking systems, particularly such systems operable in conjunction with a regenerative braking system employed in an electric powered or a hybrid vehicle.

2. Description of the Related Art

Dynamic braking to quickly stop an electric motor and any load it may be powering is an old and well-known technique which converts the mode of operation from that of a motor to that of a generator. Traditionally, the kinetic energy of the system is dissipated in a braking resistor as heat. The effectiveness of dynamic braking is dependent on the ohmic value of the braking resistor and on motor speed, falling off at lower speeds.

Rising energy costs and environmental concerns have lead to the recent popularity of electric and more especially hybrid vehicles which are powered at least part of the time by an electric motor operating from an onboard storage battery. These vehicles provide the opportunity to operate the electric motor as a generator to slow the vehicle. With conventional friction braking or traditional dynamic braking, the kinetic energy of the vehicle is wastefully dissipated a heat. Utilizing the electric energy generated by the motor during dynamic braking to recharge the onboard battery (known as regenerative braking) is far more energy efficient. Unfortunately, concerns such as the speed-dependent efficiency prohibit the exclusive use of regenerative vehicle braking. Typically, the vehicle is also equipped with hydraulic brakes.

As the effectiveness of regenerative braking diminishes with vehicle speed, more reliance must be put on the hydraulic system. Also, it is desirable to blend the effects of regenerative braking and hydraulic braking in a manner undetectable by the driver. U.S. Pat. No. 4,425,005 teaches a vehicle braking system having one brake circuit actuated directly by pressure generated in a master cylinder and a second brake circuit actuated by pressure generated by actuation of the master cylinder to the extent that regenerative braking effort acting on the wheels having brakes in the second brake circuit is insufficient to provide the desired total braking effort on those wheels. When regenerative braking on those wheels is sufficient to meet the braking effort demand, the hydraulic brake system does not supply any additional braking effort to those wheels. A compliance control member provides the feel of input travel and force equivalent to the regenerative braking effort actually at the wheels of the second brake circuit when regenerative braking is occurring during vehicle braking. The absorbed displacement and force is fed back to the second brake circuit by the compliance control member when the regenerative braking effort becomes insufficient to meet the braking effort demanded from the brakes of the second brake circuit.

A more recent effort is disclosed in U.S. Pat. No. 6,176, 556. Here, a vacuum boosted hydraulic brake system diminishes the amount of vacuum boost in proportion to the amount of regenerative braking. One drawback of this system is that the hydraulic system is operable on all four wheels while the regenerative system is employed on only two of the wheels. The system diminishes the overall vacuum boost which could lead to disproportionate braking between the front and rear.

Current boosters for regenerative braking systems typically include a pedal simulator, a boosted power piston, and a gap between them to allow for manual push-through in case of a loss of boost pressure. During regenerative braking, the pressure to the brakes must be reduced as traction braking is increased. At the same time, brake pedal travel and force should be consistent with the driver's deceleration request and independent of the mix of hydraulic and regenerative braking. The pedal simulator provides this decoupled pedal feel. In most systems, the boost pressure generated is proportional to the pedal input force. Valves in the downstream ESP (Electronic Stability Program) hydraulic unit are used to hold off, reduce, and increase the brake pressure at various times during a stop, providing the blending function.

SUMMARY OF THE INVENTION

The present invention provides a control valve having a transfer function which is a linear gain of boost pressure output based on pilot pressure input. The curve is offset by the fixed amount of lost force required to open the valve. This offset force, which is indicative of the regenerative braking contribution, is determined by the springs and pressure forces in the system.

One object of the invention is the manipulation of this force offset.

The invention comprises, in one form thereof, a hydraulic braking system for a vehicle having both hydraulic and regenerative braking including a master cylinder having a reservoir inlet port and an outlet port which is responsive to vehicle operator applied brake pedal pressure to close the inlet port and a provide pilot pressure at the outlet port. A two position spool valve is effective in a first position to hydraulically couple the cylinder outlet port with a hydraulic pedal simulator and in a second position to apply pilot pressure directly to a vehicle wheel brake actuator. A control valve provides boost hydraulic pressure from a pressure source to a vehicle wheel brake actuator in proportion to the pressure differential between the pilot pressure and a hydraulic pressure proportional to regenerative braking torque.

An advantage of the present invention is that the hydraulic booster itself does the pressure reduction and increase based on one or more inputs from the brake system controller. The ESP hydraulic unit is not required to control the brake pressure blending.

BRIEF DESCRIPTION OF THE DRAWINGS

FIG. 2 is a series of three graphs showing boost pressure as a function of pilot pressure at different levels of regenerative braking;

FIG. 3 is a schematic illustration of the source of the fluidic control inputs to FIG. 1; and FIG. 3a shows two typical electrical input waveforms for creating the illustrated control pressure.

Corresponding reference characters indicate corresponding parts throughout the several drawing views.

DETAILED DESCRIPTION OF THE INVENTION

Figure 1:
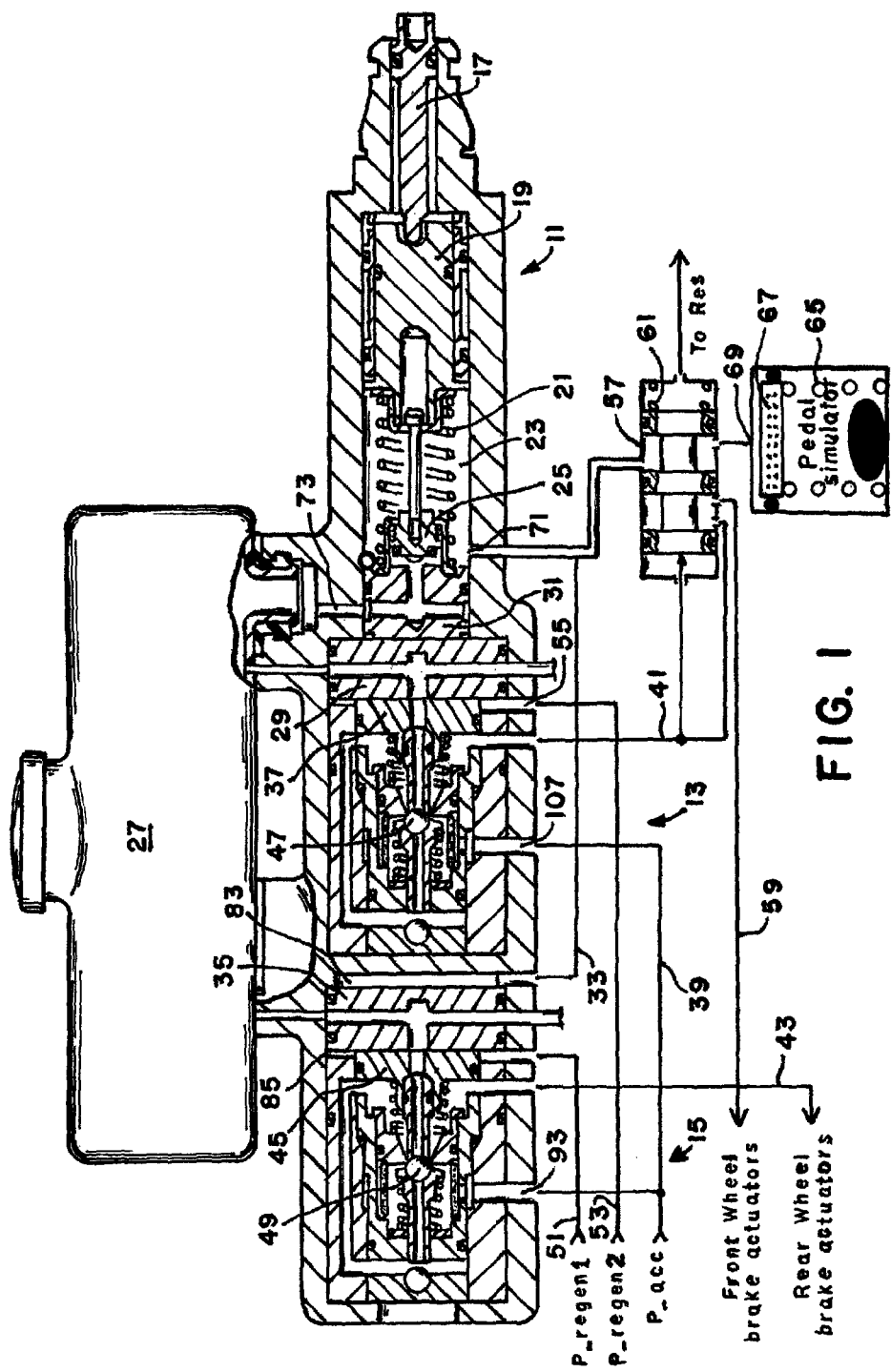
FIG. 1 is a schematic illustration of a master cylinder, two control valves and related components in accordance with the invention in one form.

Referring now to the drawings and particularly to FIG. 1, there is shown a master cylinder 11 mechanically coupled to a first boost pressure control valve 13 and hydraulically coupled to a second boost pressure control valve 15. The master cylinder and control valves share a common housing only a portion of which is shown. The master cylinder receives input operator brake pedal pressure by way of push rod 17 which urges piston 19 toward the left as viewed against the bias of spring 21 creating a braking level indicative pressure or pilot pressure in chamber 23. As the piston compresses the spring and creates the pilot pressure in chamber 23, it also closes a small valve 25 cutting off communication between the chamber 23 by way of inlet port 73 with the reservoir 27. Pilot pressure is supplied to the right face of pressure differential control piston 29 by the mechanical engagement with piston 31 and hydraulically by way of line 33 to the right face of the pressure differential control piston 35. When the pressure differential pressure piston 29 engages actuation piston 37, the continued applied pilot pressure causes piston 37 to translate toward the left. Initial leftward motion of piston 37 closes a first outlet valve 47 interrupting communication between the control valve 13 and the reservoir 27. Further leftward motion opens communication between accumulator pressure input line 39 and front wheel brake pressure line 41. Increasing applied pressure causes additional translation of the piston 37 increasing the boosted brake pressure applied to the front wheel brakes. Similarly, application of pilot pressure to the right face of piston 35 causes control piston 35 and actuation piston 45 to translate toward the left. Initial leftward motion of actuation piston 45 closes a second outlet valve 49 interrupting communication between the control valve 15 and the reservoir 27. Further leftward motion opens communication between accumulator pressure input line 39 and rear wheel brake pressure line 43. Piston 35 is also exposed to hydraulic pressure supplied to the left face thereof by way of line 51, thus, the net force piston 35 applies to piston 45 is the difference between the two pressures in lines 33 and 51 (assuming equal piston face areas are exposed). If the effective piston areas on opposite sides of piston 35 are unequal, appropriate scaling of the P_regen1 signal may be employed. For example, pistons 35 and 45 could be formed as a single piston having two different diameter portions. The control piston 35 is reciprocable axially a short distance within its cylindrical chamber dividing that chamber into two smaller variable volume chambers, one chamber 83 receiving pilot pressure and the other chamber 85 receiving proportional pressure. With pistons 35 and 45 formed as a single piece, the annular area of the face exposed to pressure in chamber 85 would be significantly less than the area exposed to pressure in chamber 83. The pressure in line 51 is proportional to the regenerative braking torque while the pressure in line 33 is proportional the requested braking torque, with the difference in pressures indicating the amount of additional hydraulic braking needed. Similarly, a pressure in line 53 proportional to the regenerative braking torque P_regen2 is applied to inlet port 55 of control valve 13 and to the left face of piston 29 urging that piston in a rightward direction to close the control valve. Operator pedal input force which is equivalent to pilot pressure urges the piston 29 leftwardly tending to open valve 13 and apply boost pressure to line 41. This boost pressure is transmitted through spool valve 57 and line 59 to the front wheel brake actuators.

Spool valve 57 is two position valve biased by a spring 61 toward the left as viewed away from the position shown and into a position where pilot pressure in line 33 is blocked from the pedal simulator and is instead directed through line 59 to directly operate the front wheel brake actuators. Initial brake pedal actuation opens valve 13 conveying a fraction of accumulator pressure in line 39 to line 41 and when the pressure in line 41 exceeds that spring bias, the valve translates to the operative position shown. Thus, the valve 57 provides a fail-safe operation of the vehicle brakes in the event boost pressure is lost.

The pedal simulator 63 includes a cylinder and a spring 65 biased piston 67 forming a variable volume chamber with a single port 69 for receiving and expelling fluid. The port is hydraulically coupled to the master cylinder outlet port 71 by the two position spool valve 57 as shown in FIG. 1. Thereafter, the chamber expands against the urging of spring 65 as the pilot pressure increases, giving the vehicle operator a natural pedal opposition to increasing force.

FIG. 2 illustrates the relationship between input pilot pressure along the horizontal or x-axis and valve output pressure as ordinate. The relationships shown apply to either valve 13 or 15, but will be described only for valve 15. Assuming no regenerative braking contribution, some modest brake pedal pilot pressure (about 4 bars as illustrated) is required before the valve begins to supply boost pressure in line 43 to the rear wheel brake actuators as shown at point 75. From this point on, there is a linear relationship 77 between pilot pressure (valve input) and boost pressure (valve output). However, if on initial brake pedal depression, some regenerative braking is applied, a greater pedal pressure is required to initiate the application of boost pressure to the wheel brake actuators after which, assuming constant regenerative contribution, the same relationship between pilot pressure and boost pressure prevails as shown by line 79. The effect of a still greater regenerative contribution is shown by line 81. The slopes of all three lines illustrated are the same indicating a constant boost gain. That is, the relationship between pilot pressure and boost pressure is substantially linear with the regeneration contribution serving to shift that relationship without changing the gain. The proportional pressure translates the relationship so as to commence the supply of boost pressure at a different pilot pressure without changing the gain. It should be understood that the control valve operates in a continuous way between the discrete regeneration control pressure levels shown.

The source of the boost pressure in line 39 as well as the regenerative braking contribution control pressures in lines 51 and 53 is illustrated in FIG. 3. A motor 87 driven pump 89 responds to pressure sensor 105 to maintain a supply of fluid under pressure in an accumulator 91. The accumulator pressure is supplied directly to the inlet ports 107 and 93 of the valves 13 and 15 respectively.

Accumulator pressure is also supplied to the inlets of a pair of normally closed solenoid operated valves 95 and 97 the outlets of which connect by way of a pair of normally open solenoid operated valves 99 and 101 to a low pressure return such as a reservoir 103. The regeneration contribution indicative pressures, P_regen1 in line 51 and P_regen2 in line 53, are derived from the respective lines connecting the normally closed valves with the normally open valves. The normally closed solenoid operated valves are selectively operable to supply accumulator pressure to their respective control valve while the normally open solenoid operated valves normally provide a low pressure fluid return path from their respective control valve. The normally open solenoid operated valves are selectively operable to block communication between the corresponding control valve and a low pressure return path. It is possible to simultaneously enable and disable one series connected pair of valves with a duty cycle signal proportional to one regenerative braking contribution and the other series connected pair of valves with a signal having a duty cycle which is proportional to the other regenerative braking contribution, however, a more efficient scheme is shown in FIG. 3a. Here, the C2 signal goes high closing valve 99. Thereafter, C1 goes high for two successive pulses building the P_regen 1 signal in steps. A short interruption in C1 allows the P_regen 1 signal to decay somewhat and later valve 99 is disabled opening the return line and dropping P_regen1 back to zero. A different regenerative contribution would have a different pulse width modulation pattern. An appropriate duty cycle to provide an output P_regen2 proportional to another regenerative braking contribution may be generated in a similar way. In the case of a power failure, both P_regen signals go to zero.

In summary, the control valves include a means of adding a controllable amount of force to the control valve input in opposition to the pilot pressure. This additional force decreases the boost pressure output for a given pilot pressure input resulting in lower brake pressure in the affected circuit. On the control valve transfer function, it increases the offset and shifts the gain curve to the right as illustrated in FIG. 2. Because the slope (gain) of the control valve is not changed, two or more control valves can be controlled by the same input while maintaining a constant difference of brake pressure across the range of input pressure. This allows the power train controller to independently request different levels of regeneration on the two axles.

The system consists of an input master cylinder 11, a pedal simulator 63, and one or more hydraulic control valves 13, 15. In one implementation, the pressure from the pedal simulator is used as a pilot pressure input to the hydraulic control valves. The control valve may regulate a boost pressure with a specified gain to drive a slave master cylinder. Alternatively, the boost pressure can drive the brakes directly. The control valve may be similar to implementations that have been used in the past, but modified to include an extra chamber area 85 into which regeneration control pressure is introduced. The regeneration control pressure provides an opposing force to pilot pressure input. Implementations using two master cylinders and one control valve may be employed. An alternative implementation could employ a linear solenoid to provide the opposition force.

Thus, while a preferred embodiment has been disclosed, numerous modifications will occur to those of ordinary skill in this art. Accordingly, the scope of the present invention is to be measured by the scope of the claims which follow.

What is claimed is:

1. A hydraulic braking system for use in a vehicle employing both hydraulic and regenerative braking, comprising:
    a master cylinder having an outlet port, said cylinder responsive to vehicle operator applied brake pedal pressure to provide pilot pressure at the outlet port;
    a hydraulic pedal simulator;
    a two position spool valve operable in a first position to directly hydraulically couple the cylinder outlet port with the pedal simulator and in a second position to apply pilot pressure directly to a vehicle wheel brake actuator and to block the pilot pressure from the pedal simulator;
    a first source and a second source each providing hydraulic proportional pressure proportional to regenerative braking torque; and
    a control valve for providing boost hydraulic pressure from a boost pressure source to the vehicle wheel brake actuator in proportion to a pressure differential between the pilot pressure and the hydraulic proportional pressure, wherein there are two hydraulic braking circuits, one for supplying boost pressure to vehicle front wheels and the other for supplying boost pressure to vehicle rear wheels, two regenerative braking circuits, one for braking vehicle front wheels and the other for braking vehicle rear wheels, the first source and the second source providing front and rear proportional hydraulic pressures proportional to respective front and rear regenerative braking torque, and wherein the control valve includes a first control valve and a second control valve, the first control valve providing boost hydraulic pressure from the boost pressure source to a respective one of the two hydraulic braking circuits in proportion to the pressure differential between the pilot pressure and one of the front and rear proportional hydraulic pressures, and the second control valve providing boost hydraulic pressure from the boost pressure source to the other of the two hydraulic braking circuits in proportion to the pressure differential between a mechanical force equivalent to the pilot pressure and the other of the front and rear respective proportional hydraulic pressures.

2. The braking system of claim 1, wherein the spool valve is biased toward the second position and assumes the first position only when boost pressure is applied thereto.

3. The braking system of claim 1, wherein one of the first and second control valves includes an actuation piston biased toward a closed position and opening in response to applied pressure to supply boost hydraulic fluid at a pressure proportional to the applied pressure from the boost pressure source to the vehicle wheel brake actuator, and a pressure differential control piston for controlling the actuation piston and for applying pressure to open the actuation piston when the pilot pressure exceeds the hydraulic proportional pressure.

4. The braking system of claim 3, wherein the control piston is reciprocable axially within a cylindrical chamber dividing that chamber into two smaller variable volume chambers, one chamber receiving pilot pressure and the other chamber receiving one of the front and rear proportional hydraulic pressures.

5. The braking system of claim 1, wherein the pedal simulator includes a cylinder and a resiliently biased piston forming a variable volume chamber with a single port for receiving and expelling fluid, the port hydraulically coupled to the master cylinder outlet port by the two position spool valve in the first position.

6. A hydraulic braking system for use in a vehicle employing both hydraulic and regenerative braking, comprising:
    a brake boost pressure source having a motor driven pump and a boost pressure accumulator to provide a boost hydraulic pressure, the motor driven pump selectively actuable to maintain fluid at a pressure in the accumulator;
    a master cylinder having a reservoir inlet port and an outlet port, said cylinder responsive to vehicle operator applied brake pedal pressure to close the inlet port and provide pilot pressure at the outlet port;
    a hydraulic pedal simulator hydraulically coupled to the outlet port through a two position spool valve;
    a proportional pressure source providing a hydraulic proportional pressure proportional to regenerative braking torque; and
    a control valve coupled to the brake boost pressure source for providing the boost hydraulic pressure from the brake boost pressure source to a vehicle wheel brake actuator in proportion to a pressure differential between the pilot pressure and the hydraulic proportional pressure, wherein the two position spool valve is operable in a first position to hydraulically couple the master cylinder outlet port with the pedal simulator and in a second position to apply the pilot pressure from the master cylinder outlet port directly to the vehicle wheel brake actuator, the spool valve being spring biased toward the second position and assuming the first position only when the boost pressure is applied thereto.

7. The braking system of claim 6, wherein the source for providing hydraulic pressure proportional to regenerative braking torque includes the accumulator, a normally closed solenoid operated valve selectively operable to supply accumulator pressure to the control valve, a normally open solenoid operated valve normally providing a low pressure fluid return path from the control valve and selectively operable to block communication between the control valve and the low pressure fluid return path, and a control circuit for enabling and disabling the respective valves with appropriate duty cycles to provide an output proportional to the regenerative braking torque.

8. The braking system of claim 6, wherein the control valve includes an actuation piston biased toward a closed position and opening in response to an actuation piston applying pressure to supply boost hydraulic fluid at a pressure proportional to the applied pressure from the brake boost pressure source to the vehicle wheel brake actuator, and a pressure differential control piston for controlling the actuation piston applying pressure to open the actuation piston when the pilot pressure exceeds the hydraulic proportional pressure.

9. The braking system of claim 6, wherein the hydraulic pedal simulator includes a resiliently biased piston defining a variable volume chamber having a port in fluid communication with the master cylinder outlet port when the spool valve is in the first position.

10. A hydraulic braking system for use in a vehicle employing both hydraulic and regenerative braking, comprising:
 a master cylinder having an outlet port, said cylinder responsive to vehicle operator applied brake pedal pressure to provide pilot pressure at the outlet port;
 a spool valve having a first position and a second position;
 a hydraulic pedal simulator including a resiliently biased piston defining a variable volume chamber having a port in direct fluid communication with the master cylinder outlet port when the spool valve is in the first position and blocked from direct fluid communication with the master cylinder outlet port when the spool valve is in the second position;
 a proportional pressure source providing a hydraulic proportional pressure proportional to regenerative braking torque; and
 a control valve for providing boost hydraulic pressure from a boost pressure source to a vehicle wheel brake actuator in proportion to a pressure differential between the pilot pressure and the hydraulic proportional pressure, the control valve including an actuation piston biased toward a closed position and opening in response to an applied pressure from a pressure differential control piston to supply boost hydraulic fluid at a pressure proportional to the applied pressure from the boost pressure source to the vehicle wheel brake actuator, and the pressure differential control piston configured to control the actuation piston applying pressure and to open the actuation piston when the pilot pressure exceeds the hydraulic proportional pressure, wherein the control valve is configured such that the relationship between pilot pressure and boost hydraulic pressure is substantially linear with constant gain, the hydraulic proportional pressure translating that relationship so as to commence the supply of boost pressure at a different pilot pressure without changing the gain.

11. The braking system of claim 10, wherein the control piston is reciprocable axially within a cylindrical chamber dividing that chamber into two smaller variable volume chambers, one chamber receiving the pilot pressure and the other chamber receiving the hydraulic proportional pressure.

12. The braking system of claim 10, wherein the spool valve is operable in the first position to hydraulically couple the cylinder outlet port with the pedal simulator and in the second position to apply pilot pressure directly to the vehicle wheel brake actuator, the spool valve being spring biased toward the second position and assuming the first position only when boost pressure is applied thereto.

* * * * *